United States Patent [19]
Emori

[11] Patent Number: 4,673,145
[45] Date of Patent: Jun. 16, 1987

[54] CASSETTE HOLDER IN RECORDING AND REPRODUCING APPARATUS FOR MAGNETIC TAPE CASSETTE HAVING UNDERSIDE-COVERING SLIDING SHUTTER MEMBER

[75] Inventor: Masashi Emori, Tokyo, Japan
[73] Assignee: Sony Corporation, Tokyo, Japan
[21] Appl. No.: 819,827
[22] Filed: Jan. 17, 1986
[30] Foreign Application Priority Data
 Jan. 23, 1985 [JP] Japan ................................. 60-10446
[51] Int. Cl.$^4$ ............................................. G11B 23/04
[52] U.S. Cl. .................................... 242/198; 360/132
[58] Field of Search ............................... 242/197–200; 360/96, 96.5, 96.6, 132

[56] References Cited
U.S. PATENT DOCUMENTS
 3,950,787 4/1976 Hosaka ............................ 242/198 X
 4,572,461 2/1986 Horikawa et al. .................. 242/198
 4,576,345 3/1986 Koken et al. ...................... 242/198

Primary Examiner—John M. Jillions
Attorney, Agent, or Firm—Vorys, Sater, Seymour & Pease

[57] ABSTRACT

A lock release mechanism in a cassette holder is applicable to magnetic tape cassettes of the type provided with a pivotal closure lid pivotally secured to opposite edges of a casing for movement between a closed position and an open position, wherein the closure lid is pivoted away from said opening to allow access to the tape while in use. The cassette also has a sliding closure member slidably mounted on one face of the casing and cooperative with the aforementioned pivotal closure lid. The sliding closure member is held in its closed position while the pivotal closure lid is in its closed position to cover a bottom spacing through which a device constituting part of a tape handling mechanism may be inserted, and in its open position while the pivotal closure lid is in its open position to allow the aforementioned device of the tape handling mechanism to engage the casing through the bottom spacing for extracting the tape for loading onto the rotary head, and is retained in its closed and open positions by means of a locking member. The lock release mechanism is provided in a cassette holder of the recording and reproducing apparatus and comprises a projection means which releases the lock on the sliding closure member to allow movement thereof from the closed position to the open position and from the open position to the closed position.

64 Claims, 19 Drawing Figures

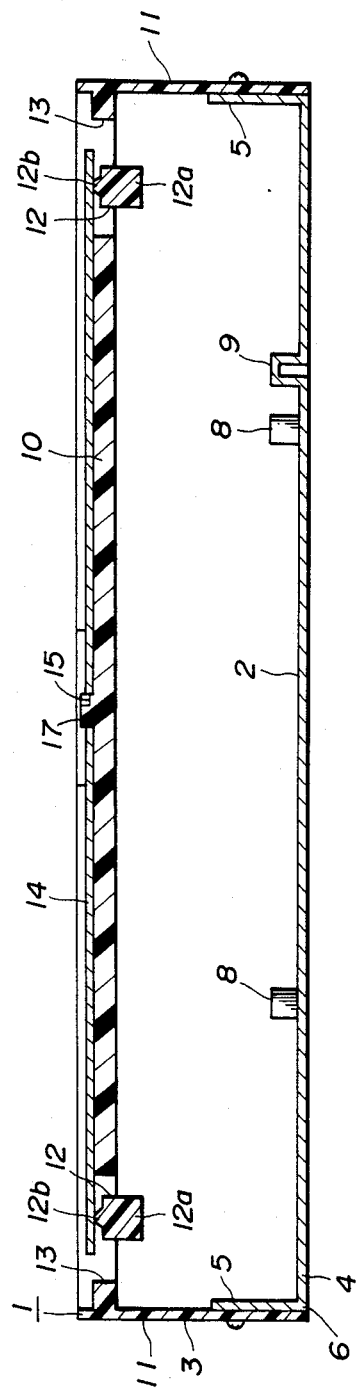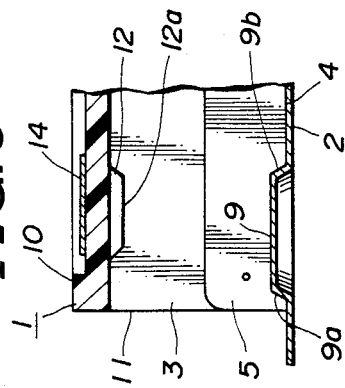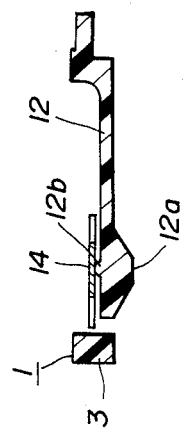

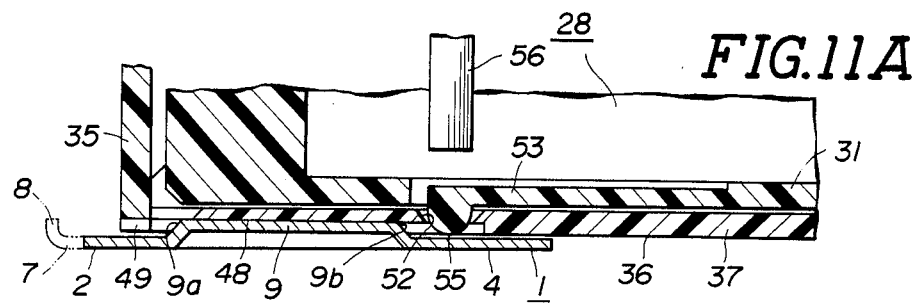
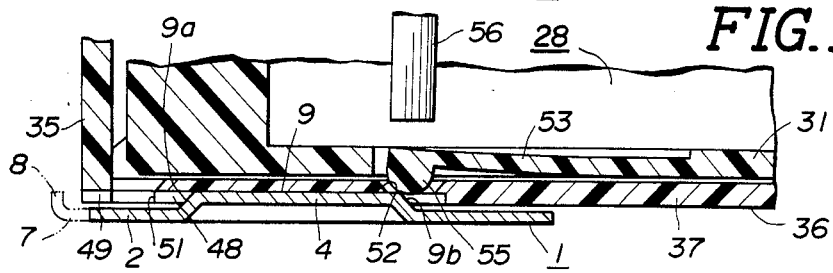
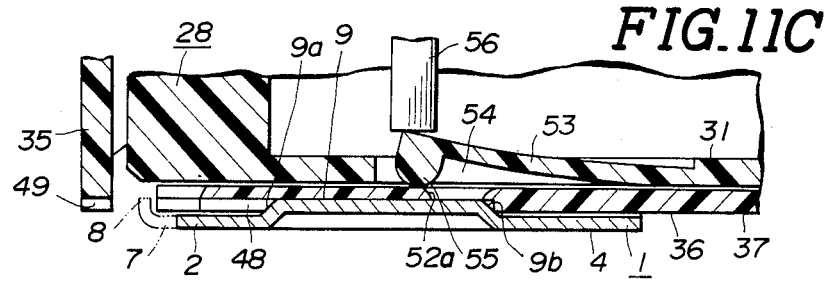
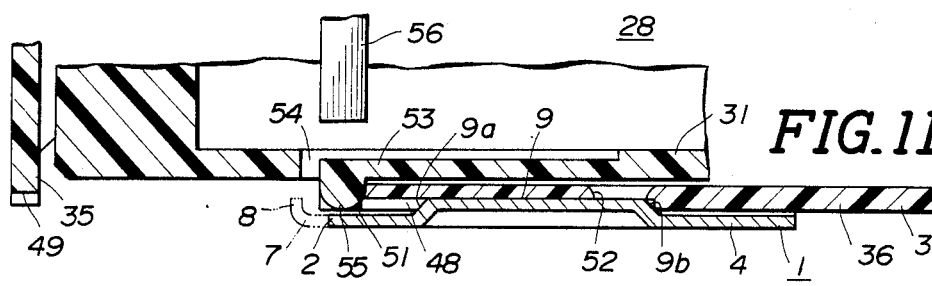
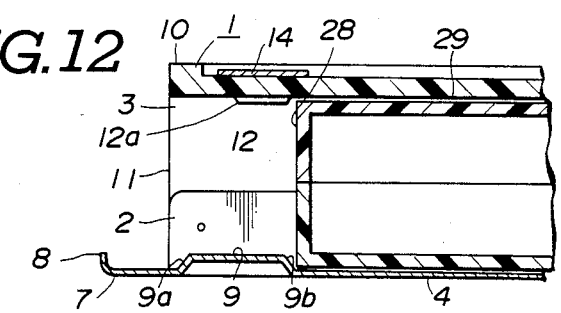

CASSETTE HOLDER IN RECORDING AND REPRODUCING APPARATUS FOR MAGNETIC TAPE CASSETTE HAVING UNDERSIDE-COVERING SLIDING SHUTTER MEMBER

BACKGROUND OF THE INVENTION

The present invention relates generally to a cassette holder in a recording and reproducing apparatus for a magnetic tape cassette which includes a sliding shutter which covers an opening or openings in the underside of a cassette casing. More specifically, the invention relates to a cassette holder having a mechanism for unlocking a lock for the sliding shutter. Still more particularly, the invention relates to a lock release mechanism for a sliding shutter on a tape cassette which is active both upon insertion of a cassette into, and ejection from, a cassette hold so that the shutter members may be locked, and released, both in its opened and closed positions.

In recent years, various types of recording and reproducing apparatus have been developed to convert analog signals, such as audio signals and the like, into digital signals, e.g. PCM signals, which are then recorded on and reproduced from magnetic tape serving as a recording medium. Some of these apparatuses employ rotary heads in order to achieve a relatively high recording density. A recording and reproducing apparatus specifically designed to record and reproduce PCM signals and employing a rotary head will be referred to as "PCM recorder" throughout the disclosure. As is known, a PCM recorder first pulls a loop of a magnetic tape out through a front opening of the tape cassette and winds the tape around a rotary drum accommodating the rotary head. When the tape is so located, the recording and reproducing is performed. In such digital recording and reproducing systems, oily deposits, such as fingerprints or the like, and/or dust adhering to the tape surface may cause a dropout of reproduced signals.

Various approaches have been tried to protect the magnetic recording medium. For example, a closure lid may be used to retractably cover the front end opening of the cassette, through which the tape is extracted for access by a rotary head. That closure lid is held closed while the tape is not in use and is moved to an open position when the cassette is inserted into the PCM recorder. With this earlier approach, a drawback may be encountered when the closure lid is unintentionally or accidentally opened, exposing the tape to oily fingerprints, dust and so forth while it is not in use. A locking mechanism which can conveniently lock the closure lid in its open and closed positions was proposed to resolve this problem.

Such a magnetic tape cassette which has a tape-protective pivotal lid has been disclosed in the U.S. Pat. No. 3,980,255, issued on Sept. 14, 1976, to Akio Serizawa and assigned to the assignee of the present invention. In the disclosure, the magnetic tape cassette for a magnetic recording and/or reproducing apparatus has a housing with an opening through which the tape can be withdrawn from the cassette housing for the recording and reproduction of signals thereon, as by one or more rotary heads. A lid is provided to normally close the housing opening when the cassette is not in use, thereby to protect the tape from damage. The lid is associated with a latch mechanism for locking the lid in its closed position, and this latch mechanism can be released by inserting the cassette into a cassette holder.

The magnetic tape cassette disclosed in the U.S. patent application Ser. No. 678,813, filed on Mar. 14, 1985 by Hiroshi Meguro, now U.S. Pat. No. 4,572,461 and assigned to the assignee of the present invention, has a sliding closure or shutter for closing a lower opening which allows entry of a loading device and a tape reel drive of the recording and reproducing apparatus. This sliding closure also is movable between open and close positions. The sliding shutter is associated with a lock mechanism which locks in it both its open and its closed positions.

In order to enable a recording and reproducing apparatus to handle the aforementioned type of magnetic tape cassette, there must be a mechanism or device for releasing the locking mechanism so that the sliding shutter may move from its closed position to the open position and back. Thus, it was a problem to provide such a lock release mechanism which is able to smoothly release the shutter member from either or both its locked-closed position or its locked-open position.

SUMMARY OF THE INVENTION

Therefore, it is an object of the present invention to provide a cassette holder in a recording and reproducing apparatus for a magnetic tape cassette, which can effectively release a sliding shutter of a magnetic tape from the locking effect of a lock mechanism and thus enable the sliding shutter to move between open and closed positions.

As will be appreciated, the lock release mechanism in the cassette holder of the present invention is applicable to magnetic tape cassettes of the type provided with a p;ivotal closure lid pivotably secured to opposite edges of a casing for movement between a closed position, in which the front opening of the casing through which a magnetic tape can be extracted for loading onto a rotary head is sealed while not in use, and an open position, wherein the closure lid is pivoted away from said opening to allow access to the tape while in use. The cassette must also have a sliding closure member slidably mounted on one face of the casing which cooperates with the pivotal closure lid. The sliding closure member is held in its closed position while the pivotal closure lid is in its closed position to cover a bottom spacing through which a device constituting part of a tape handling mechanism may be inserted. On the other hand, the sliding closure member is held in its open position while the pivotal closure lid is in its open position to allow the aforementioned device of the tape handling mechanism to engage the casing through the bottom spacing for extracting the tape for loading onto the rotary head. The sliding closure member is retained in its closed and open positions by means of a locking member. The locking member is associated with the cassette casing and resiliently establishes locking engagement with the sliding closure member. The locking member has an locking head which engages the sliding closure member but does not protrude from the lower surface of the sliding closure member.

In the preferred embodiment of the magnetic tape cassette, the locking member comprises a resilient arm extending integrally from the bottom of the cassette casing and a locking head formed integrally with the free end of the resilient arm.

According to the present invention, a lock release mechanism is provided in a cassette holder of the recording and reproducing apparatus. The lock release mechanism comprises a projection means which releases the lock on the sliding closure member to allow movement thereof from the closed position to the open position when the magnetic tape cassette is inserted into the cassette holder for loading and from the open position to the closed position when the magnetic tape cassette is ejected.

According to one aspect, the invention relates to a cassette holder in a recording a reproducing apparatus for a magnetic tape cassette, which comprises a cassette casing having a mouth through which a magnetic tape is accessible, the mouth including a first opening in a front end face of the casing and a second opening in a lower section of the casing adjacent the front end face, a pair of tape reels around which the magnetic tape is wound, a pivotal lid covering and exposing the first opening of the mouth, a sliding shutter member slidable with respect to the lower section of the cassette casing and adapted to cover and expose the second opening in the lower section, the shutter member being movable between a first position in which it covers the second opening and a second position in which it exposes the second opening, and a locking means for normally holding the shutter member in both of the first and second positions and allowing the shutter member to move from the first position to the second position when the cassette is inserted into an associated recording and reproducing apparatus, and from the second position to the first position when the cassette is ejected. The cassette holder comprises a holder body defining a cassette reception space and having a floor on which the cassette is mounted, and means, incorporated in the holder body and cooperatively associated with the locking means, for unlocking the locking means, the unlocking means having a first component active at the first position of the shutter member to allow movement of the shutter member from the first position to the second position when the magnetic tape cassette is inserted into the cassette reception space, and a second component active for unlocking the locking means at the second position of the shutter member for allowing movement of the shutter member from the second position to the first position when the magnetic tape cassette is ejected from the recording and reproducing apparatus.

The unlocking means comprises a projection means projecting from the floor of the holder body, the projection means having a leading edge serving as the first component for actuating the locking means into an unlocking position to allow the shutter member to move from the first position to the second position during insertion of the magnetic tape cassette into the cassette reception space in the holder body, and a trailing edge serving as the second component for actuating the locking means into a unlocking position to allow the shutter member to move from the second position to the first position during ejection of the magnetic tape cassette from the cassette reception space in the holder body The leading and trailing edges of the projection means are slanted so that the locking means is smoothly actuated and its functions are smoothly accomplished.

The projection means is formed integrally with the floor of the holder body. In the preferred embodiment, the floor of the holder body is made of metal plate and the projection means is formed by pressing.

As alternatives, the floor of the holder body may be made of a synthetic resin and the projection is integrally formed with the floor by molding. Otherwise, the floor of the holder body may be made of metal plate and the projection means is made of a synthetic resin material and bonded to the floor.

As a further alternative, the floor of the holder body is made of a synthetic resin and the projection may be made of a synthetic resin separately from the floor and bonded onto the floor.

According to another embodiment, the unlocking means comprises a projection means projecting from the floor of the holder body, the projection means having a first projection forming the first component and having a leading edge for actuating the locking means into an unlocking position to allow the shutter member to move from the first position to the second position during insertion of the magnetic tape cassette into the cassette reception space in the holder body, and a second projection forming the second component and having a trailing edge for actuating the locking means into an unlocking position to allow the shutter member to move from the second position to the first position during ejection of the magnetic tape cassette from the cassette reception space in the holder body. In another embodiment, the leading and trailing edges of the projection means are also slanted so that the locking means is moothly actuated and its functions smoothly accomplished.

The cassette holder further comprises an actuation claw associated with the shutter member for actuating the shutter member from the first position to the second position. The actuation claw is adapted to hold the shutter member at the second position after the magnetic tape cassette has been inserted into the cassette holder.

The cassette holder is adapted to receive such a magnetic tape cassette having a pivotal lid which has a first and a second cut-out in its lower horizontal edge, and the projection means passes through the first cut-out and the actuation claw passes through the second cut-out when the magnetic tape cassette is inserted into the cassette reception space in a correct orientation.

The holder body has at least one opening through which the magnetic tape cassette is inserted, and the actuation claw is longitudinally offset from the projection means and located at a position remote from the opening with respect to the projection means. In the alternative, the actuation claw is tranversely offset from the projection means and located at a position remote from the central axis of the holder body with respect to the projection means.

The cassette holder further comprises a lifter means, associated with the holder body, for moving the holder body up and down relative to a mechanical chassis of the recording and reproducing apparatus.

The holder body also has a ceiling defining an opened box-shaped space open at its front and rear ends and serving as the cassette reception space, which ceiling has means for resiliently biasing the magnetic tape cassette downward against the floor. The magnetic tape cassette has a groove inits lower surface, the groove extending to a locking opening to establish locking engagement with the locking means at the first position of the shutter member and transversely opposing the first cut-out of the pivotal lid, and wherein the projection means enters and passes through the groove to actuate the locking means into the unlocking position.

Another aspect of the invention relates to a recording and reproducing apparatus for a magnetic tape cassette which comprises a cassette casing having a mouth through which a magnetic tape is accessible, the mouth including a first opening in a front end face of the casing and a second opening in a lower section of the casing adjacent the front end face, a pair of tape reels around which the magnetic tape is wound, a pivotal lid covering and exposing the first opening of the mouth, a sliding shutter member slidable with respect to the lower section of the cassette casing and adapted to cover and expose the second opening in the lower section, the shutter member being movable between a first position in which it covers the second opening and a second position in which it exposes the second opening, and a locking means for normally holding the shutter member in both of the first and second positions and allowing the shutter member to move from the first position to the second position when the cassette is inserted into an associated recording and reproducing apparatus, and from the second position to the first position when the cassette is ejected, and wherein the recording and reproducing apparatus comprises a mechanical chassis mounting thereon a tape loading system, a tape drive system and a magnetic head, and a cassette holder mounted on the mechanical chassis for receiving the magnetic tape cassette for recording and reproducing operations, the cassette holder comprising a holder body defining a cassette reception space and having a floor on which the cassette can rest, and means, incorporated in the holder body and cooperatively associated with the locking means, for unlocking the locking means, the unlocking means having a first component active at the first position of the shutter member to allow movement of the shutter member from the first position to the second position when the magnetic tape cassette is inserted into the cassette reception space, and a second component active for unlocking the locking means at the second position of the shutter member for allowing movement of the shutter member from the second position to the first position when the magnetic tape cassette is ejected from the recording and reproducing apparatus.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment illustrated but are for explanation and understanding only.

In the drawings:

FIG. 4 is a cross-section through the cassette holder taken along line IV—IV in FIG. 2;

FIG. 5 is a section taken along line V—V of FIG. 2;

FIG. 6 is a section taken along line VI—VI of FIG. 2;

FIGS. 11(A) to 11(D) are partial sections of the magnetic tape cassette and the cassette holder, Showing the loading process as a sequence of loading positions;

FIG. 12 is a partial section of the cassette holder of FIG. 1 receiving the magnetic tape cassette of FIG. 7.

DESCRIPTION OF THE PREFERRED EMBODIMENT

Figure 1:
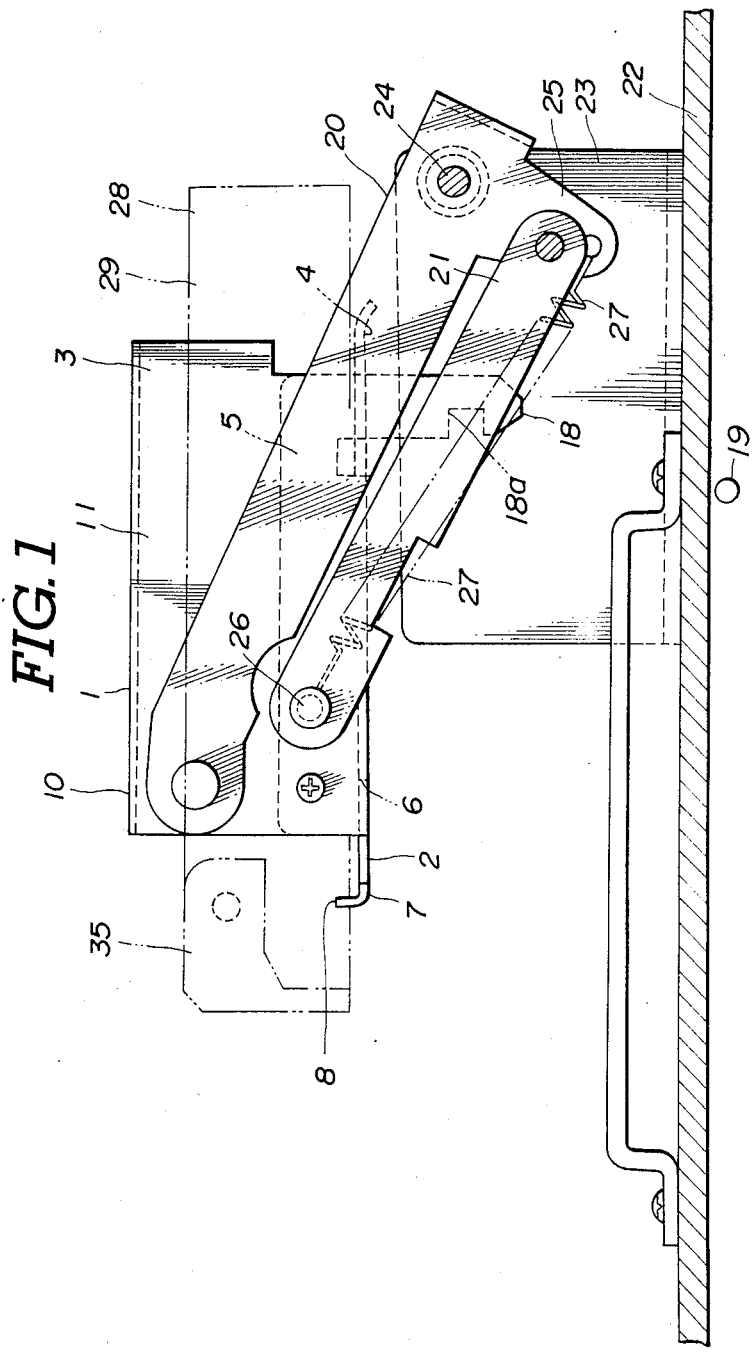
FIG. 1 is a side elevation of the preferred embodiment of a cassette holder in a recording and reproducing apparatus for a magnetic tape cassette, according to the invention.

Referring now to the drawings, and particularly to FIGS. 1 to 6, the preferred embodiment of a cassette holder 1 of the present invention is to be installed in a recording and reproducing apparatus for receiving a magnetic tape cassette of type which has a front closure lid and a bottom sliding closure. Nowadays, this type of magnetic tape cassette is available for both PCM audio cassettes, and VTR cassettes. Additionally, the preferred embodiment of the cassette holder 1 is applicable to magnetic tape cassettes of similar construction. In the shown embodiment, the cassette holder 1 is designed for use as a PCM audio cassette tape player. The cassette holder 1 is structurally adapted to receive a cassette for pivotable transport to a predetermined location in the tape player.

The cassette holder 1 generally comprises a lower holder 2 and an upper holder 3. The lower holder 2 is made from a metal plate and has a bottom plate 4 with a pair of side walls 5 extending vertically from the edges of the bottom plate. The bottom plate 4 has a front edge with a cut-out 6 near or at its center. The cut-out 6 is narrower at its outer ends than near its center. The bottom plate 4 is also formed with circular openings 6' for receiving reel shafts (not shown) of a PCM audio player system. A pair of projections 7 project from the front edge of the bottom plate, i.e. from the front edge of the cut-out 6. The projections 7 have upwardly bent front ends which form upwardly extending claws 8. The bottom plate 4 also has an elongated upward projection near its front edge which is transversely offset from the center of the cassette holder. The projection 9 lies parallel to the longitudinal axis of the cassette holder. The projection 9 has tapered front and rear ends 9a and 9b.

It should be noted that, in the shown embodiment, the projection 9 is integral with the bottom plate 4 and formed by pressing.

The upper holder 3 is made of a synthetic resin and has a ceiling palte 10 and a pair of descending side walls 11 extending from its transverse edges. The sides walls 11 are fixed to the side walls 5 of the lower holder 2 to form an opened box-shaped cassette receptacle which is open at its front and rear ends.

Figure 2:
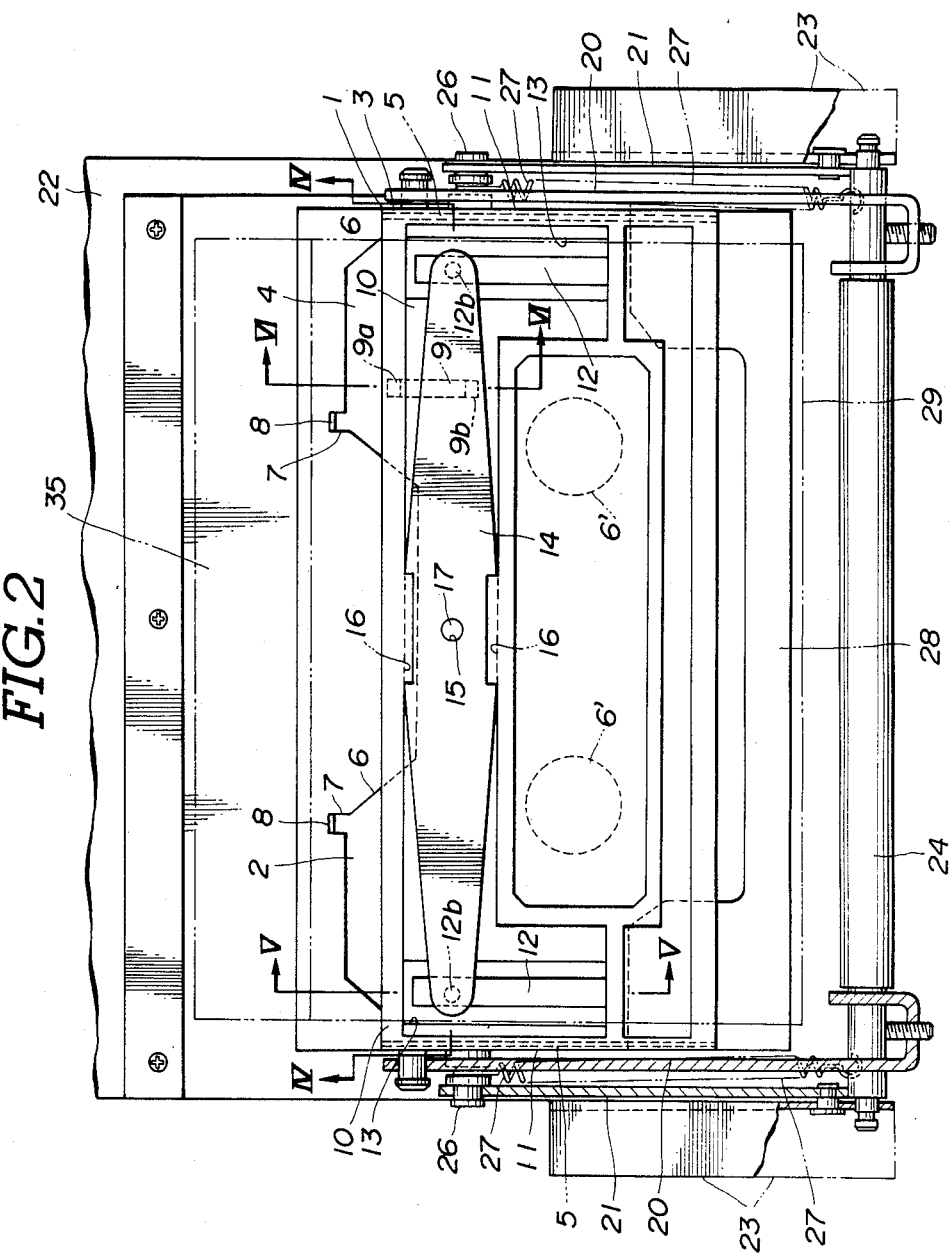
FIG. 2 is a plan view of the cassette holder of FIG. 1.

The upper holder 3 has depression members 12 extending longitudinally along the transverse edges of the ceiling plate 10. In the shown embodiment, the depression members 12 are formed integrally with the upper holder 3 and are connected to the major section of the ceiling plate 10 at their rear ends. As best shown in FIG. 2, the ceiling plate 10 has cut-outs 13 surrounding the depression members 12. Each depression member 12 has first section 12a extending into the interior of the cassette holder 1 and a second section 12b extending upwardly from the upper plane of the ceiling plate 10. The section 12b of the depression member 12 is in contact with a leaf spring 14 which rests on the upper plane of the ceiling plate 10 and is wider at its center than at its longitudinal ends. The width of the leaf spring 14 gradually tapers towards its ends. A through opening 15 at the center of the leaf spring 14 engages a projection 17 extending upward from the upper plane of the ceiling plate 10.

The ceiling plate 10 has a pair of longitudinally spaced grooves 16 on its upper surface near its front edge. The grooves 16 receive the front and rear edges of the central portion of the leaf spring 14, as shown in FIG. 2. The grooves 16 cooperate with the projection 17 to fix the leaf spring 14 to the upper surface of the ceiling plate 10 so that the leaf spring 14 normally biases the depression member 12 downwardly. With this arrangement, when the magnetic tape cassette 28 is inserted into the internal space of the cassette holder 1, the cassette is depressed downwardly toward the lower holder 2 by the leaf spring 14 and the depression member 12.

Figure 3:
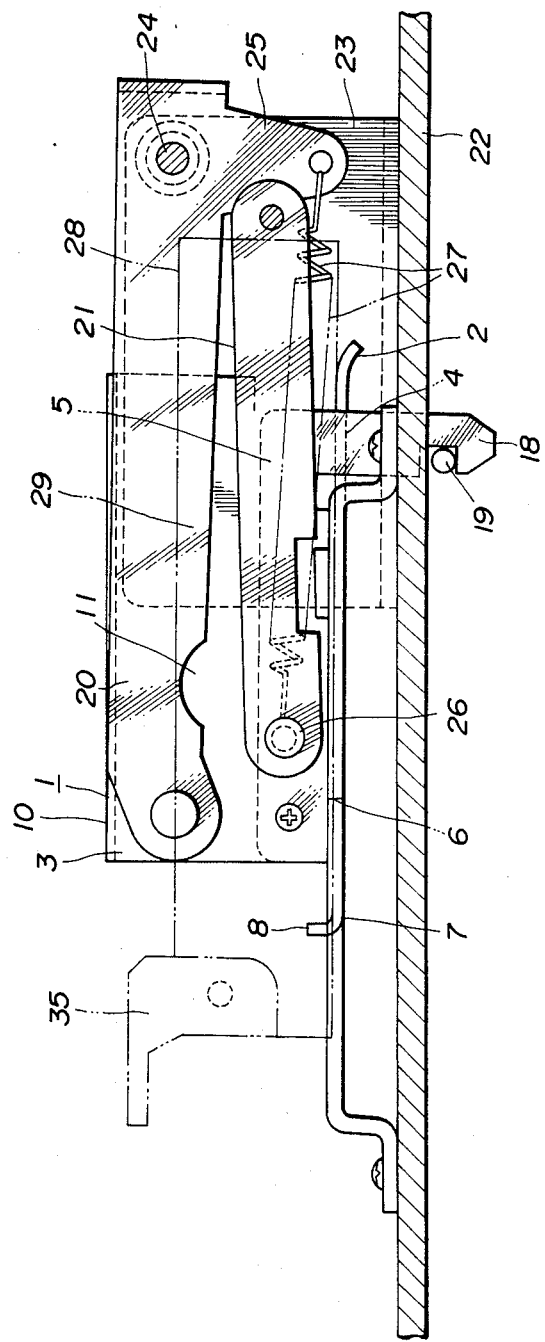
FIG. 3 is a side elevation of the cassette holder of FIG. 1, but showing the magnetic tape cassette upon completion of loading.

As shown in FIGS. 1 and 3, the lower holder has a lever 18 extending downward therefrom. A recess 18a is formed in the front vertical face of the lever 18. When the cassette holder 1 is lowered into the recording and reproduction apparatus, the lever 18 passes through an aperture in a chassis 22 and the recess 18a engages an eject-lock pin 19, which will be discussed again later.

The cassete holder 1 is supported by a mechanical chassis 22 of the PCM audio player system by means of pivotable arms 20 and 21. The pivotable arms 20 and 21 move the cassette holder 1 up and down with respect to the mechanical chassis 22. Thus, the cassette holder 1 is loaded with a cassette in its upward position and the cassette holder with the cassette loaded therein is pivoted downwardly to coact with the cassette player. To eject the cassete, the pivotable motion is reversed. Although not specifically illustrated in the drawings, various PCM audio player mechanisms, such as a pair of reel shafts, a tape-loading mechanism, a tape-drive system and so forth are mounted on the mechanical chassis 22.

A pair of supporting strips 23 extend upwardly from the mechanical chassis 22. The upper pivotable arms 20 are pivotably supported by the supporting strips 23 by means of a pivot shaft 24 which is rotatable with respect to the supporting strip 23. Each upper pivotable arm 20 has a transverse extension 25 on its lower edge near the end connected to the supporting strip 23. The pivotable arms 20 also have front ends connected to the front ends of the side walls 11 of the cassette holder 1. The front ends of the pivotable arms 20 are pivotably fastened to the side walls 11 of the cassette holder 1.

The lower pivotal arms 21 are shorter than the upper pivotal arms 20. The lower pivotal arms 21 are also pivotally connected to the supporting strip 23. The pivot axes of the lower pivotal arms 21 are below the pivot axes of the pivot shafts 24 of the upper pivotal arms 20 and slightly forward of the pivotal shafts 24. The front end of the lower pivotal arms 21 are pivotally connected to the side walls 11 of the lower holder 2 through pivot pins 26. The pivot axes of the pivot pins 26 are disposed below and rearward of the pivot axes about which the upper pivotal arms 20 pivot relative to the side walls 11.

Tension springs 27 are stretched between the lower end of the extensions 25 and the pivot pins 26. As will be appreciated from FIGS. 1 and 3, the distance between the lower end of the extensions 25 and the pivot pins 26 decreases when the cassette holder 1 moves away from the mechanical chassis 22 and increases when the cassette holder 1 approaches the mechanical chassis. Therefore, when the cassette holder 1 rests on the mechanical chassis 22, the tension of the tension spring 27 is at its greatest and thus the spring biases the upper arms 20 to pivot its front end upward. Therefore, unless a locking engagement is established by a locking mechanism for the cassette holder, which will be explained later, the cassette holder 1 will be held at the upper position shown in FIG. 1 where it allows insertion of the magnetic tape cassette 28.

In the condition of the cassette holder shown in FIG. 1, the magnetic tape cassette 28 is inserted into the cassette holder 1. The force exerted through the magnetic tape cassette 28 pivots the pivotal arms 20 and 21 counterclockwise as viewed in FIG. 1 to lower the cassette holder 1 toward the mechanical chassis 22. During this lowering motion of the cassette holder 1, the reel shafts, tape guide mechanism, the tape drive mechanism and so forth pass through the bottom plate 4 of the cassette holder to place the magnetic tape cassette in a loading condition. At the lowermost position in which the cassette holder 1 rests on the mechanical chassis, the recess 19 of the lever 18 of the cassette holder 1 comes into engagement with a locking pin 19a to establish a locking engagement in order to hold the cassette holder in place.

FIGS. 7 to 10 show the magnetic tape cassette 28 which is structurally suited for insertion into the cassette holder 1 set forth above. It should be noted that the shown magnetic tape cassette 28 is specifically designed for PCM audio recording.

The magnetic tape cassette generally comprises a casing 29 including an upper half 30 and a lower half 31 which are connected by threaded bolts (not shown) in a per se well-known manner to form a single unit. A transparent window plate 34 is built into the upper surface of the upper half 30. A pair of reel hubs 33 accommodated by the cassette casing 29 rotatably engage a pair of reel shaft insertion apertures 47. The apertures 47 are formed in the lower half 31 at predetermined positions which establish a suitable spacing betwen the reel hubs 33. Magnetic tape 32 is wound around the reel hubs 33.

Figure 9:
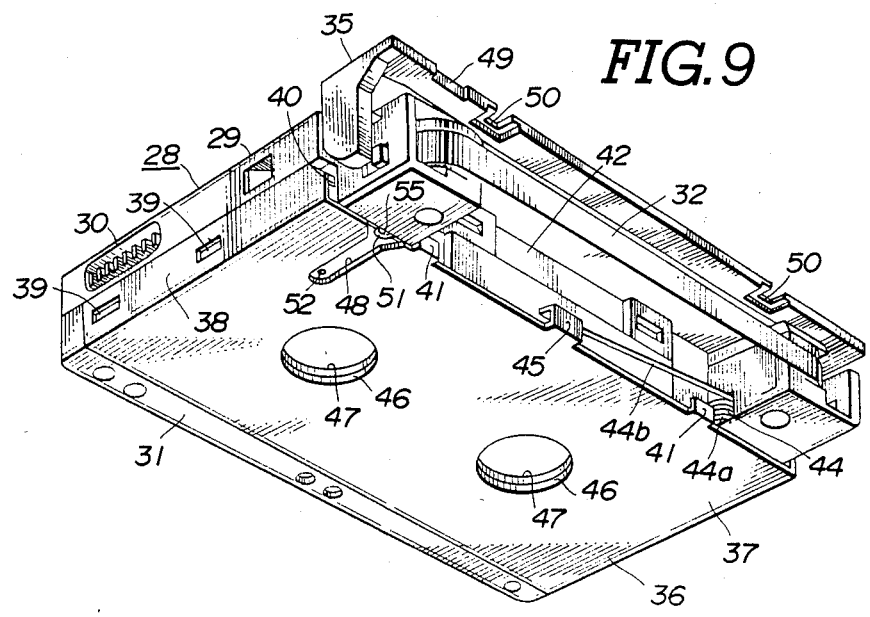
FIG. 9 is a view similar to FIG. 8 but showing the closure lid and sliding members at their open positions.
Figure 10:
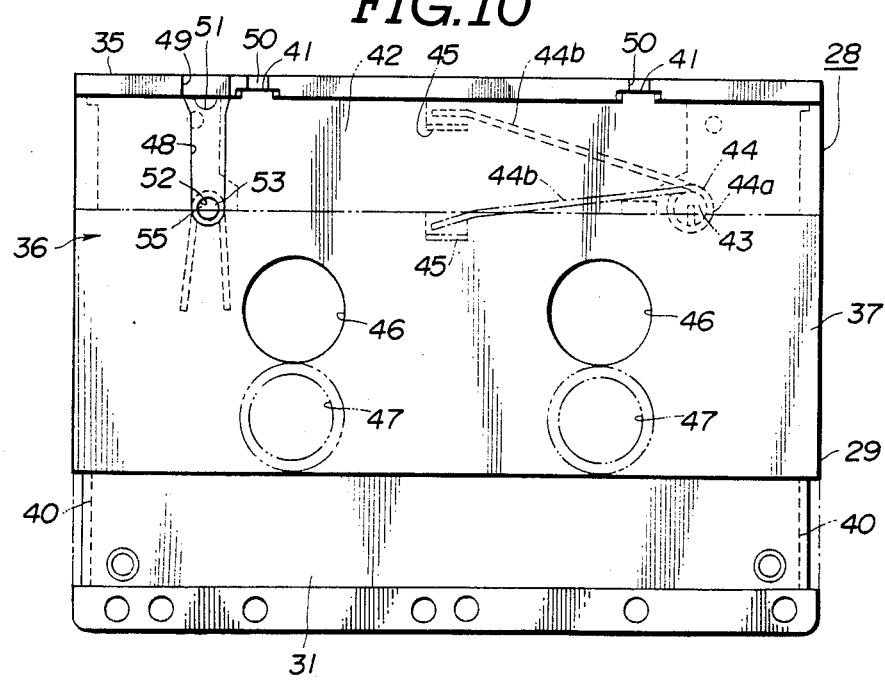
FIG. 10 is a bottom view of the magnetic tape cassette of FIG. 7.

A pivotal closure lid 35 is rotatably or pivotally attached at the right and left side walls of the cassette casing near the front end of the tape cassette. When the pivotal closure lid 35 is pivoted away from the front surface of the tape cassette, the magnetic tape 32 is exposed, as shown in FIG. 9. An essentially rectangular cut-out 42 is formed in the front edge of the lower half 31. When the magnetic tape cassette is inserted into a PCM recorder which will be briefly discussed later, a tape guide system or a device constituting part of a tape retaining mechansim (not shown) is inserted into the cut-out 42 and pulls out some of the tape 32 for loading onto a rotary head of the PCM recorder. A sliding closure member 36 engages the lower half 31 and covers and expsoes the cut-out 42 as it slides back and forth.

Figure 8:
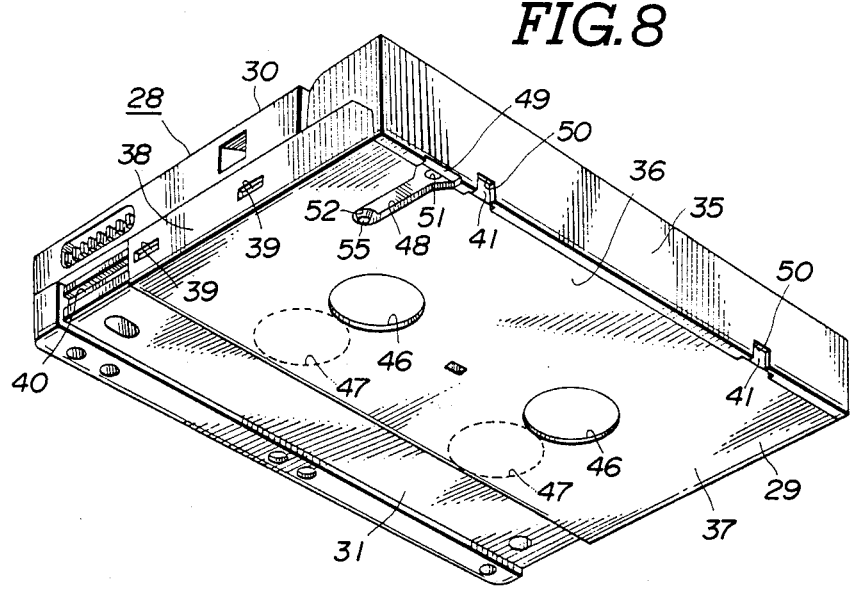
FIG. 8 is a view similar to FIG. 7 but viewing the magnetic tape cassette from below.

When the tape cassette is not in use, the pivotal closure lid 35 opposes a front opening in the front face of the casing 29 to cover the latter. At the same time, the sliding closure 36 is in its forwardly-shifted position in which it covers the cut-out 42 of the lower half 31 and thus prevents the tape guide system from reaching into the tape cassette for the tape, as shown in FIG. 8. The closure lid 35 can pivot away from the front surface of the cassette to expose the magnetic tape 32 and the sliding closure member 36 can move to the rear to expose the cut-out 42 so that the tape guide system can reach into the cut-out 42 to draw some of the magnetic tape 32 out of the cassette casing for loading onto a rotary drum for recording or playback. Thereafter, when the recording or playback is over and the tape cassette is returned to the stand-by state, the pivotal closure lid and the sliding closure member are returned to the aforementioned closed positions. Throughout the rest of this documented, the positions of the pivotal closure lid 35 and the sliding closure 36 in which they cover the front opening and the cut-out 42 respectively will be referred to as a "closed position" and the position of the lid 35 and the sliding closure 36 in which they expose the front opening and the cut-out 42 will be referred to as an "open position".

The cut-out 42 of the lower half 31 extends over a predetermined width so as to expose the rear surface of the magnetic tape 32 stretched between tape guides at either end of the front opening. During recording or reproduction, a device constituting part of the tape handling system or the tape guide system projects into the cut-out 42 and draws out a section of the magnetic tape 32. The tape handling system is part of the PCM recorder.

The pivotal closure lid 35 is elongated along the major dimension of the front opening and is pivotably attached to the front of the cassette casing 29 by means of pivot shafts (not shown). Thus, the pivotal closure lid 35 can be pivoted to selectively cover and expose the front opening of the cassette casing 29. The closure lid 35 also has a cut-out 49 forming a shallow but relatively wide groove through its lower edge near one side. In addition, cut-away portions 50 are formed by cutting small grooves into the lower edge of the lid 35 toward the left and right extremes of the cut-out 42 of the lower section 31.

The sliding closure member 36 has a flattened U-shaped configuration and is so mounted on the lower half 31 of the cassette casing 29 that it can slide back and forth parallel to the lower surface of the lower cassette half 31. Apertures 46 corresponding to the reel shaft insertion apertures 47 are formed in the sliding closure member 36 in such positions that after the sliding closure member 36 slides all the way backwards to expose the cut-out 42, the apertures 46 are respectively aligned with the reel shaft insertion apertures 47.

The sliding closure member 36 comprises a flat plate 37 which lies parallel to the lower surface of the lower half 31 and side plates 38 along the left and right sides of the flat plate 37 which lie parallel to the outer surfaces of the left and right side walls of the lower half 31. Flanges (not clearly shown) are formed by bending the upper ends of the side plates 38 inwards. The flanges are restrained vertically but not horizontally between the side walls of the upper and lower sections 30, 31 after the casing 29 is assembled.

Contact pieces 41 extend upwards perpendicularly from the front edge of the flat plate 37 at positions opposite the cut-away portions 50 of the closure lid 35. The contact pieces 41 enable the recording-reproducing apparatus to slide the closure 36 to the rear in preparation for opening the cassette 28 in a manner described later.

A hook 45 is formed on the front edge of the flat plate 37. The hook 45 is centered between the contact pieces 41. One leg 44b of a torsion spring 44, the coil 44a of which is housed in the front portion of the lower half 31, engages the hook 45. The torsion spring exerts a forward biasing force on the sliding closure member 36. When the sliding closure member 36 is in its open position, as shown in FIG. 3, the torsion spring 44 is stressed and exerts a counteracting force biasing the sliding closure member 36 toward its closed position.

The sliding closure member 36 is also formed with a circular hole 52 and a semicircular cut-out 51. The semicircular cut-out 51 opens onto the front edge of the sliding closure member 36. A thin groove 48 in the lower surface of the sliding closure member 36 connects the hole 52 and the cut-out 51. The groove 48 has a tapered end opening onto the front end of the sliding closure member opposite the cut-out 49. The hole 52 and the cut-out 51 are so arranged as to engage a locking projection or head 55 of a locking lever 53 which is integrally formed with the lower half 31.

Figure 7:
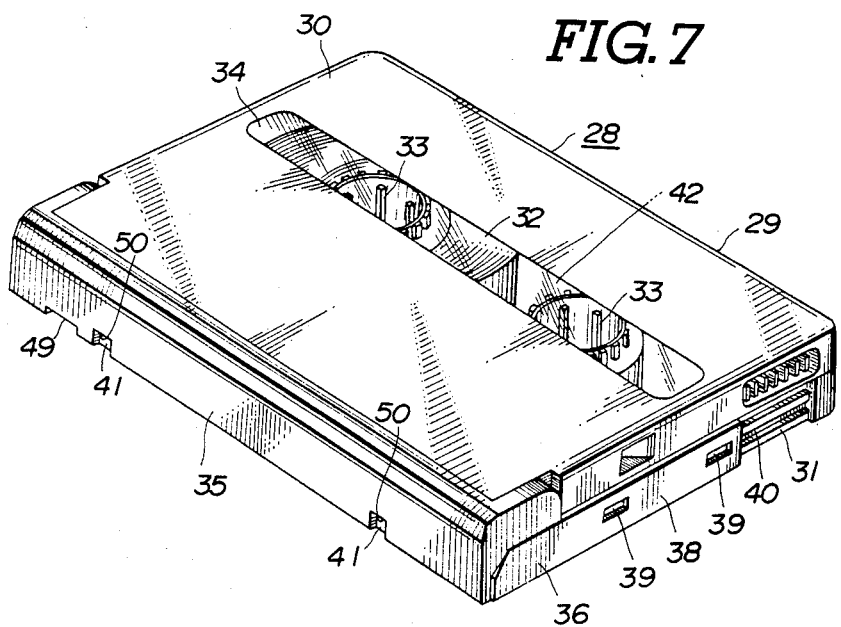
FIG. 7 is a perspective view of a magnetic tape cassette suitable for use in the cassette holder of FIGS. 1 to 6.

As shown in FIGS. 7 and 8, the lower half 31 of the casing is formed with a pair of guide grooves 40 extending along each of the side walls parallel to each other and to stepped rests. Neither the rests nor the guide grooves 40 are as deep as the arms of the closure lid 35 are thick. The guide grooves 40 also receive the upper edges of the sliding closure 36. Also, the guide grooves 40 slidably receive inwardly depressed indentations 39 in the side plates 38 of the sliding closure 36. Sliding engagement between the grooves 40 and the edges and the indentations 39 guides sliding movement of the sliding closure 36 with respect to the cut-out 42 along the side walls of the lower section In the shown construction, when the tape cassette is not in use, the closure lid 35 is in its closed position shown in FIGS. 7 and 8 to cover the front opening. At the same time, the sliding closure member 36 is in its closed position (FIGS. 7 and 8), thus covering the cut-out 42. In this case, the locking head 55 of the locking lever 53 is in engagement with the hole 52 as shown in FIG. 8. As will be apparent from FIG. 8, the locking head 55 of the locking lever 53 lies fully within the groove 48 so that it does not protrude downwards from the lower surface of the sliding closure member 36.

When the tape cassette is to be used in a PCM recorder, the cassette is first inserted into the preferred embodiment of a cassette holder 1, according to the invention. The operation of the preferred embodiment of the cassette holder in the PCM recorder will be described herebelow with reference to FIGS. 11 to 13.

During insertion of the magnetic tape cassette 28 into the cassette holder, the tapered rear end 9b of the projection 9 projecting from the lower holder 2 passes through the cut-out 49 and enters the groove 48 of the sliding shutter member 37, as shown in FIG. 11(A). Further frontward movement of the magnetic tape cassette 28 brings the rear end 9b of the projection 9 into contact with the locking head 55 of the locking lever 53, as shown in FIG. 11(B). As a result, the locking head 55 is urged upwards and held there by contact with the top surface of the projection 9. While the locking head 55 is held upward, the claws 8 of the projections 7 pass through the cut-outs 50 in the lower edge of the closure lid 35 and engage the contact members 41 on the front edge of the sliding shutter member 36. This exerts a force acting against the force inserting the magnetic tape cassette 28 into the cassette holder 28 on the sliding shutter member 36 so as to bias the latter rearwards. This rearward counter force shifts the locking head 55 further upwards along the tapered edge 52a of the hole 52 as shown in FIG. 11(C). This coaction releases the locking engagement between the locking head 55 and the hole 52 and so allows further rearward movement of the sliding shutter member 36. After slight rearward movement of the sliding shutter member 36, the locking head 55 comes into contact with the upper surface of the sliding shutter member 36 and thereafter is held in the upper, unlocked position. Thus, when the locking head 55 is so positioned free from engagement with the hole 52, the sliding shutter member 36 is free to move rearward against the biasing force exerted by the torsion spring 44.

When the magnetic tape cassette 28 is fully inserted into the cassette holder 1 and thus reaches the set position, the sliding shutter member 36 will be in its predetermined rearmost position, wherein the openings 46 are in alignment with the reel shaft insertion apertures 47 in the lower half 31 and the cut-out 42 is exposed to accept the tape guide system and/or the tape retaining mechanism. In this position, the locking head 55 of the locking lever 53 opposes the front end cut-out 51 of the sliding shutter member 36. The resilient force exerted by the deformed locking lever 53 drives the locking head 55 downward into engagement with the cut-out 51. Thus, a locking engagement retaining the sliding shutter member 36 in its rearmost position is established.

When the sliding shutter member 36 is in its closed position, the upper edge thereof restricts pivotal movement of the pivotal lide 35 due to its contact with the lower edge of the arms. When the sliding shutter member 36 is shifted to the rearmost position, the pivotal lid 36 becomes free from this restriction and is free to open about its pivot.

After the magnetic tape cassette 28 is set in the cassette holder 1, the pivotable arms 20 and 21 pivot to shift the cassette holder from the position of FIG. 1 to the position of FIG. 3. During this downward movement of the cassette holder, an actuation pin (not shown) projecting from the mechanism chassis comes into contact with the lower edge of the pivotal lid 35 and pushes the latter upwards. As a result, the pivotal lid 35 is pivoted upwards to the open position, as shown in FIGS. 3 and 9.

On the other hand, when the magnetic cassette is to be ejected from the recording and reproducing apparatus, the locking engagement between the eject-lock pin 19 and the locking recess 18a of the lever 18 is released by depression of an eject button provided in the recording and reproducing apparatus. Releasing the locking engagement allows the cassette holder 1 to move upwards in accordance with the resilient force exerted on the pivotal arms 20. During this upward movement, the pivotal lid 35 contacts with an appropriate member to be moved back to the closed position.

At the upper position of the cassette holder 1, the magnetic tape cassette 28 can be pulled rearward. As a result, the locking head 55 of the locking lever 53 comes into contact with the tapered front end 9a of the projection 9. As a result, the locking head 55 is pushed upward against the resilient force exerted by the lever 53. At the same time, the spring force of the torsion spring 44 acts to shift the sliding shutter member 36 frontward. The spring force applied to the sliding shutter member 36 moves the locking head 55 further upwards to be released from engagement with the cut-out 51. Therefore, the sliding shtuter member 36 becomes free to move frontwardly to its closed position automatically due to the spring force of the torsion spring 44.

At the forwardmost position, the locking head 55 again opposes the hole 52 through the sliding shutter member 36 and engages therewith. Thus, a locking engagement restricting movement of the sliding shutter member 36 is established.

As will be appreciated, providing the lock at the open position of the sliding shutter member 36 successfully prevents accidental closure of the sliding shutter member due to the spring force constantly exerted thereon by the torsion spring 44. On the other hand, providing the described lock release mechanism, which is active both upon insertion of the magnetic tape cassette and upon ejection of the cassette, makes it possible to lock the sliding shutter member in its open position.

A cassette holder similar to the foregoing preferred embodiment, for locking of the sliding shutter member but lacking the release mechanism, has been disclosed in U.S. Pat. No. 3,950,787, issued on Apr. 13, 1976 to Motohiko Hosaka, and assigned to the assignee of the present invention. The cassette receiving operation and up-and-down motion of the cassette holder have been described in detail in that disclosure. The operation of this prior cassette holder may be adpated for use in the preferred embodiment of the cassette holder according to the invention. Therefore, the contents of the aforementioned the U.S Pat. No. 3,950,787 are hereby incorporated by reference for the sake of disclosure.

Figure 13A:
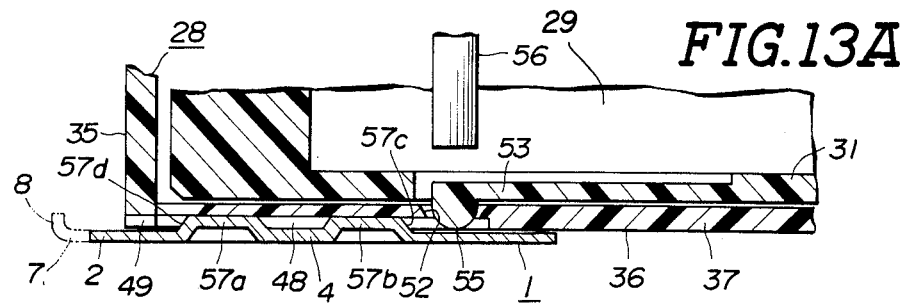
FIGS. 13(A) to 13(D) are partial sections of the cassette holder and the magnetic tape cassette, showing various modifications of the preferred embodiment.
Figure 13B:
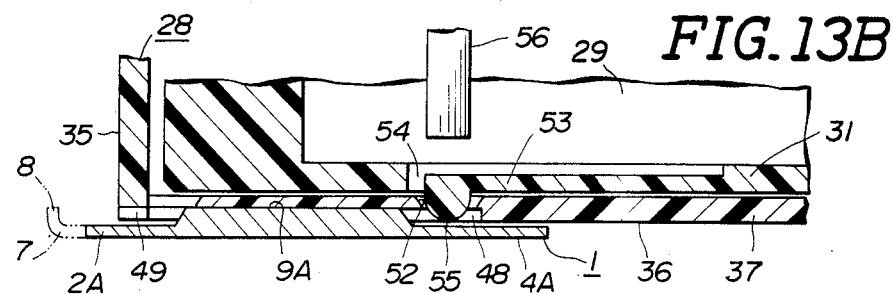
Figure 13C:
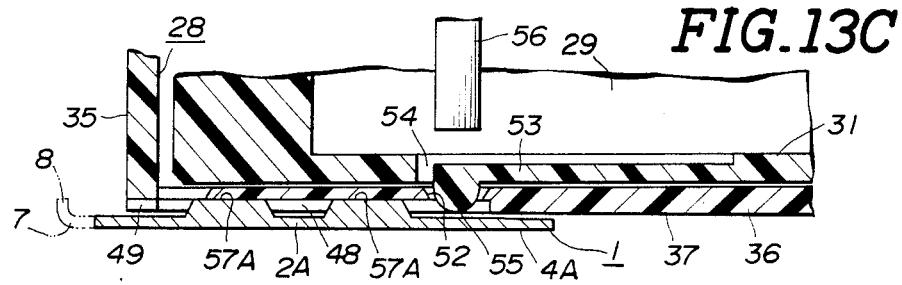
Figure 13D:
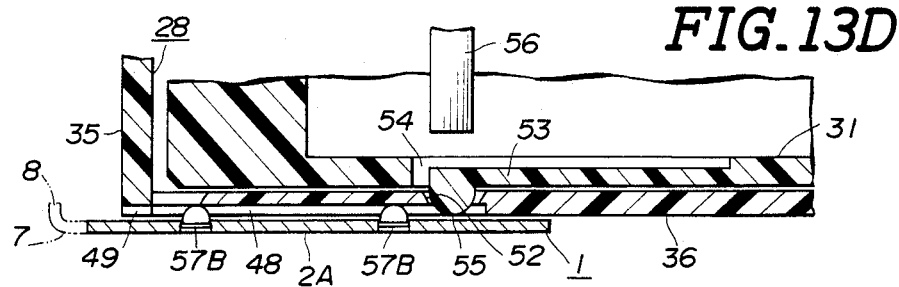

FIGS. 13(A) and 13(B) show modifications to the foregoing preferred embodiment of a lock release mechanism for the locking mechanism for the sliding shutter member 36. In the modification of FIG. 13(A), there is provided a pair of longitudinally-aligned projections 57a and 57b. The projection 57b has at least a tapered rear end 57c which acts substantially the same as the rear end 9b of the projection 9. The projection 57a also has at least a tapered front end 57d acting substantially the same as the front end 9a of the projection 9.

In the modification of FIG. 13(B), the lower holder 2 has a bottom plate 4A which is made of a synthetic resin. A solid projection 9A is formed integrally with the bottom plate 4A by resin molding.

It should be appreciated that, though the preferred embodiment of the cassette holder has been disclosed hereabove in relation to the specific construction of the magnetic tape cassette, the cassette holder of the present invention will be able to handle various types of magnetic tape cassettes. For example, the lock release mechanism as set out hereabove can handle various sliding shutter locking mechanisms such as is disclosed in the aforementioned U.S. Pat. No. 4,572,461.

Therefore, the present invention fulfills all of the objects and advantages sought therefor.

While the specific arrangements of the preferred embodiments of the invention have been disclosed hereabove in order to facilitate full understanding of the invention, the invention should not be considered to be limited to the specific embodiments but includes all possible embodiments and modifications of the embodiments which can be realized without departing from the principles of the invention set out in the appended claims.

What is claimed is:

1. A cassette holder in a recording and reproducing apparatus for a magnetic tape cassette comprising a cassette casing having a mouth through which a magnetic tape is accessible, said mouth including a first opening in a front end face of said casing and a second opening in a lower section of the casing adjacent said front end face, a pair of tape reels around which said magnetic tape is wound, a pivotal lid covering and exposing said first opening of said mouth, a sliding shutter member slidable with respect to the lower section of said cassette casing and adapted to cover and expose said second opening in said lower section, said shutter member being movable between a first position in which it covers said second opening and a second position in which it exposes said second opening, and a locking means for normally holding said shutter member in both of said first and second positions and allowing said shutter member to move from said first position to said second position when said cassette is inserted into an associated recording and reproducing apparatus, and from said second position to said first position when said cassette is ejected said cassette holder comprising:

a holder body defining a cassette reception space and having a floor on which said cassette is mounted; and means, incorporated in said holder body and cooperatively associated with said locking means, for unlocking said locking means, said unlocking means having a first component active at said first position of said shutter member to allow movement of said shutter member from said first position to said second position when said magnetic tape cassette is inserted into said cassette reception space, and a second component active for unlocking siad locking means at said second position of said shutter member for allowing movement of said shutter member from said second position to said first position when said magnetic tape cassette is ejected from said recording and reproducing apparatus.

2. The cassette holder as set forth in claim 1, wherein said unlocking means comprises a projection means projecting from said floor of said holder body, said projection means having a leading edge serving as said first component for actuating said locking means into an unlocking position to allow said shutter member to move from said first position to said second position during insertion of said magnetic tape cassette into said cassette reception space in said holder body, and a trailing edge serving as said second component for actuating said locking means into an unlocking position to allow said shutter member to move from said second position to said first position during ejection of said magnetic tape cassette from said cassette reception space in said holder body.

3. The cassette holder as set forth in claim 2, wherein said leading and trailing edges of said projection means are slanted so that the functions of said locking means are smoothly accomplished.

4. The cassette holder as set forth in claim 3, wherein said projection means is formed integrally with said floor of said holder body.

5. The cassette holder as set forth in claim 4, wherein said floor of said holder body is made of metal plate and said projection means is formed by pressing.

6. The cassette holder as set forth in claim 4, wherein said floor of said holder body is made of a synthetic resin and said projection is integrally formed with said floor by molding.

7. The cassette holder as set forth in claim 3, wherein said floor of said holder body is made of metal plate and said projection means is made of a synthetic resin material and bonded to said floor.

8. The cassette holder as set forth in claim 3, wherein said floor of said holder body is made of a synthetic resin and said projection is made of a synthetic resin separately from said floor and bonded onto said floor.

9. The cassette holder as set forth in claim 1, wherein said unlocking means comprises a projection means projecting from said floor of said holder body, said projection means having a first projection forming said first component and having a leading edge for actuating said locking means into an unlocking position to allow said shutter member to move from said first position to said second position during insertion of said magnetic tape cassette into said cassette reception space in said holder body, and a second projection forming said second component and having a trailing edge for actuating said locking means into an unlocking position to allow said shutter member to move from said second position to said first position during ejection of said magnetic tape cassette from said cassette reception space in said holder body.

10. The cassette holder as set forth in claim 9, wherein said leading and trailing edges of said projection means are slanted so that the functions of said locking means are smoothly accomplished.

11. The cassette holder as set forth in claim 10, wherein said projection means is formed integrally with said floor of said holder body.

12. The cassette holder as set forth in claim 11, wherein said floor of said holder body is made of metal plate and said projection means is formed by pressing.

13. The cassette holder as set forth in claim 11, wherein said floor of said holder body is made of a synthetic resin and said projection is integrally formed with said floor by molding.

14. The cassette holder as set forth in claim 10, wherein said floor of said holder body is made of metal plate and said projection means is made of a synthetic resin material and bonded to said floor.

15. The cassette holder as set forth in claim 10, wherein said floor of said holder body is made of a synthetic resin and said projection is made of a synthetic resin separately from said floor and bonded onto said floor.

16. The cassette holder as set forth in claim 2, which further comprises an actuation claw associated with said shutter member for actuating said shutter member from said first position to said second position.

17. The cassette holder as set forth in claim 16, wherein said actuation claw is adapted to hold said shutter member at said second position after said magnetic tape cassette has been inserted into said cassette holder.

18. The cassette holder as set forth in claim 16, in which said pivotal lid has a first cut-out and a second cut-out in its lower horizontal edge, and said projection means passes through said first cut-out and said actuation claw passes through said second cut-out when said magnetic tape cassette is inserted into said cassette reception space in a correct orientation.

19. The cassette holder as set forth in claim 18, wherein said holder body has at least one opening through which said magnetic tape cassette is inserted, and said actuation claw is longitudinally offset from said projection means and located at a position remote from said opening with respect to said projection means.

20. The cassette holder as set forth in claim 18, wherein said holder body has at least one opening through which said magnetic tape cassette is inserted, and said actuation claw is transversely offset from said projection means and located at a position remote from a central axis of said holder body with respect to said projection means.

21. The cassette holder as set forth in claim 19, wherein said actuation claw is also transversely offset from said projection means and located at a position remote from a central axis of said holder body with respect to said projection means.

22. The cassette holder as set forth in claim 1, which further comprises a lifter means, associated with said holder body, for moving said holder body relative to a mechanical chassis of said recording and reproducing apparatus.

23. The cassette holder as set forth in claim 1, wherein said holder body also has a ceiling defining an opened box-shaped space which is open at front and rear ends and serving as said cassette reception space, which ceiling has means for resiliently biasing said magnetic tape cassette downward against said floor.

24. The cassette holder as set forth in claim 17, in which said magnetic tape cassette has a groove in its lower surface, said groove extending to a locking opening to establish locking engagement with said locking means at said first position of said shutter member and transversely opposing said first cut-out of said pivotal lid, and wherein said projection means enters and passes through said groove to actuate said locking means into said unlocking position.

25. The cassette holder as set forth in claim 24, in which said locking means has a locking head engageable to said locking opening to establish said locking engagement, and the depth of said groove at least matches the corresponding dimension of said locking head protruding from said shutter member, and wherein said projection means engaging said groove serves as a guide for insertion of said magnetic tape cassette into said cassette reception space.

26. The cassette holder as set forth in claim 19, wherein said actuation claw comprises a hook releasably engaging said shutter and exerting a sliding force thereupon as said cassette is inserted into said recording and reproducing apparatus.

27. The cassette holder as set forth in claim 1, which is adapted to receive magnetic tape cassettes which further comprise a pair of reel hubs housed in said cassette casing which hold said tape reels within said cassette casing, and around which a magnetic tape is wound and which are exposed from the lower surface of said cassette casing through openings formed in the lower section of the cassette casing, a pivotable front lid mounted near the front of said cassette casing and covering an opening in the front part of said cassette casing, and said sliding shutter member is formed with a pair of reel shaft insertion apertures through which a pair of reel shafts can engage said reel hubs, said sliding shutter member positioning said reel shaft insertion apertures in a position offset from said opening in the lower section of said cassette casing at its first position and in alignment with said reel shaft insertion apertures at its second position.

28. A recording and reproducing apparatus for a magnetic tape cassette which comprises a cassette casing having a mouth through which a magnetic tape is accessible, said mouth including a first opening in a front end face of said casing and a second opening in a lower section of the casing adjacent said front end face, a pair of tape reels around which said magnetic tape is wound, a pivotal lid covering and exposing said first opening of said mouth, a sliding shutter member slidable with respect to the lower section of said cassette casing and adapted to cover and expose said second opening in said lower section, said shutter member being movable between a first position in which it covers said second opening and a second position in which it exposes said second opening, and a locking means for normally holding said shutter member in both of said first and second positions and allowing said shutter member to move from said first position to said secodn position when said cassette is inserted into an associated recording and reproducing apparatus, and from said second position to said first position when said cassette is ejected, said recording and reproducing apparatus comprising:
a mechanical chassis mounting thereon a tape loading system, a tape drive system and a magnetic head; and
a cassette holder mounted on said mechanical chassis for receiving said magnetic tape cassette for recording and reproducing operations, said cassette holder comprising:
a holder body defining a cassette reception space and having a floor on which said cassette can rest; and
means, incorporated in said holder body and cooperatively associated with said locking means, for unlocking said locking means, said unlocking means having a first component active at said first position of said shutter member to allow movement of said shutter member from said first position to said second position when said magnetic tape cassette is inserted into said cassette reception space, and a second component active for unlocking said locking means at said second position of said shutter member for allowing movement of said shutter member from said second position to said first position when said magnetic tape cassette is ejected from said recording and reproducing apparatus.

29. The apparatus as set forth in claim 28, wherein said unlocking means comprises a projection means projecting from said floor of said holder body, said projection means having a leading edge serving as said first component for actuating said locking means into an unlocking position to allow said shutter member to move from said first position to said second position during insertion of said magnetic tape cassette into said cassette reception space in said holder body, and a trailing edge serving as said second component for actuating said locking means into an unlocking position to allow said shutter member to move from said second position to said first position during ejection of said magnetic tape cassette from said cassette reception space in said holder body.

30. The apparatus as set forth in claim 29, wherein said leading and trailing edges of said projection means are slanted so that said locking means is smoothly actuated.

31. The apparatus as set forth in claim 30, wherein said projection means is formed integrally with said floor of said holder body.

32. The apparatus as set forth in claim 31, wherein said floor of said holder body is made of metal plate and said projection means is formed by pressing.

33. The apparatus as set forth in claim 31, wherein said floor of said holder body is made of a synthetic resin and said projection is integrally formed with said floor by molding.

34. The apparatus as set forth in claim 30, wherein said floor of said holder body is made of metal plate and said projection means is made of a synthetic resin material and bonded to said floor.

35. The apparatus as set forth in claim 30, wherein said floor of said holder body is made of a synthetic resin and said projection is made of a synthetic resin separately from said floor and bonded onto said floor.

36. The apparatus as set forth in claim 28, wherein said unlocking means comprises a projection means projecting from said floor of said holder body, said projection means having a first projection forming said first component and having a leading edge for actuating said locking means into a unlocking position to allow said shutter member to move from said first position to said second position during insertion of said magnetic tape cassette into said cassette reception space in said holder body, and a second projection forming said second component and having a trailing edge for actuating said locking means into an unlocking position to allow said shutter member to move from said second position to said first position during ejection of said magnetic tape cassette from said cassette reception space in said holder body.

37. The apparatus as set forth in claim 36, wherein said leading and trailing edges of said projection means are slanted so that said locking means is smoothly actuated.

38. The apparatus as set forth in claim 37, wherein said projection means is formed integrally with said floor of said holder body.

39. The apparatus as set forth in claim 38, wherein said floor of said holder body is made of metal plate and said projection means is formed by pressing.

40. The apparatus as set forth in claim 38, wherein said floor of said holder body is made of a synthetic resin and said projection is integrally formed with said floor by molding.

41. The apparatus as set forth in claim 37, wherein said floor of said holder body is made of metal plate and said projection means is made of a synthetic resin material and bonded to said floor.

42. The apparatus as set forth in claim 37, wherein said floor of said holder body is made of a synthetic resin and said projection is made of a synthetic resin separately from said floor and bonded onto said floor.

43. The apparatus as set forth in claim 29, which further comprises an actuation claw associated with said shutter member for actuating said shutter member from said first position to said second position.

44. The apparatus as set forth in claim 33, wherein said actuation claw is adapted to hold said shutter member at said second position after said magnetic tape cassette has been inserted into said cassette holder.

45. The apparatus as set forth in claim 44, in which said pivotal lid has a first and a second cut-out in its lower horizontal edge, and said projection means passes through said first cut-out and said actuation claw passes through said second cut-out when said magnetic tape cassette is inserted into said cassette reception space in a correct orientation.

46. The apparatus as set forth in claim 44, wherein said holder body has at least one opening through which said magnetic tape cassette is inserted, and said actuation claw is longitudinally offset from said projection means and located at a position remote from said opening with respect to said projection means.

47. The apparatus as set forth in claim 45, wherein said holder body has at least one opening through which said magnetic tape cassette is inserted, and said actuation claw is transversely offset from said projection means and located at a position remote from the central axis of said holder body with respect to said projection means.

48. The apparatus as set forth in claim 47, wherein said actuation claw is also transversely offset from said projection means and located at a position remote from the central axis of said holder body with respect to said projection means.

49. The apparatus as set forth in claim 28, which further comprises a lifter means, associated with said holder body, for moving said holder body up and down relative to a mechanical chassis of said recording and reproducing apparatus.

50. The apparatus as set forth in claim 28, wherein said holder body also has a ceiling defining an opened box-shaped space open at front and rear ends and serving as said cassette reception space, which ceiling has means for resiliently biasing said magnetic tape cassette downward against said floor.

51. The apparatus as set forth in claim 50, in which said magnetic tape cassette is formed with a groove in its lower surface, said groove extending to a locking opening to establish locking engagement with said locking means at said first position of said shutter member and opposing to said first cut-out of said pivotal lid, and wherein said projection means enters into and passes through said groove to actuate said locking means into said unlocking position.

52. The apparatus as set forth in claim 51, in which said locking means has a locking head engageable to said locking opening to establish said locking engagement, and the depth of said groove at least matches the corresponding dimension of said locking head protruding from said shutter member, and wherein said projection means engaging said groove serves as a guide for insertion of said magnetic tape cassette into said cassette reception space.

53. A cassette holder in a recording and reproducing apparatus for a magnetic tape cassette of the type which comprises a cassette casing, a sliding shutter member slidable with respect to a portion of said cassette casing and adapted to cover and expose an opening in said portion of said cassette casing wherein said shutter member is movable between a first position in which it covers the opening and a second position in which it exposes the opening, and a locking means for normally holding said shutter member respectively in each said first and second positions and structurally adapted to allow said shutter member to move from said first position to said second position when said cassette is inserted into an associated recording and reproducing apparatus, and from said second position to said first position when said cassette is ejected, said cassette holder comprising:

means incorporated in said cassestte holder and cooperatively associated with said locking means on said cassette during both insertion and ejection for unlocking said locking means, said unlocking means including an insertion unlocking portion active at said first position of said shutter member to allow movement of said shutter member from said first position to said second position when said magnetic tape cassette is inserted into said cassette holder and an ejection unlocking means active for unlocking said locking means at said second position of said shutter member for allowing movement of said shutter member from said second position to said first position when said magnetic tape cassette is ejected from said recording and reproducing apparatus.

54. The cassette holder as set forth in claim 53, wherein said unlocking means comprises a projection means projecting from a floor of said cassette holder, said projection means defining both said insertion unlocking means and said ejection unlocking means.

55. The cassette holder as set forth in claim 54, wherein said insertion unlocking means comprises an edge of said projection means for actuating said locking means into an unlocking position to allow said shutter member to move from said first position to said second position during insertion of said magnetic tape cassette into said cassette holder.

56. The cassette holder as set forth in claim 54, wherein said ejection unlocking means comprises another edge of said projection means for actuating said locking means into an unlocking position to allow said shutter member to move from said second position to said first position during ejection of said magnetic tape cassette from said cassette reception space in said holder body.

57. The cassette holder as set forth in claim 53, wherein said cassette holder defines a projection having a first tapered end and said cassette defines a cut-out which receives said projection upon insertion of said cassette into said cassette holder.

58. The cassette holder as set forth in claim 53, wherein the sliding shutter member of said cassette includes a groove and a locking lever defining a locking head, said cassette and said cassette holder cooperating upon insertion so that said locking head is urged upwardly and maintained in such position during insertion of said cassette by contact of said locking head with a surface of said projection.

59. The cassette holder as set forth in claim 58, wherein said cassette further includes a closure lid and said sliding shutter member further includes contact members on the front edge thereof, and wherein said cassette holder includes claw projections passing through cut-outs in an edge of said closure lid to bias said sliding shutter member rearwardly.

60. The cassette holder as set forth in claim 58, wherein said cassette includes a hole for receiving said locking head in a locking engagement, said hole having a tapered edge to release the locking engagement between the locking head and the hole to allow rearward movement of the sliding shutter member upon insertion of said cassette into said cassette holder.

61. The cassette holder as set forth in claim 58, wherein said cassette further includes a front end cut-out on said sliding shutter member so that when the cassette is fully inserted into said cassette holder and said sliding shutter member is in its predetermined reareward most position, said locking head engages said front end cut-out to lock said sliding shutter member in its rearwardmost position.

62. The cassette holder as set forth in claim 58, wherein said cassette holder includes pivotal arms which pivot to shift the cassette holder from an upward position to a downward position and further includes means for pivoting a pivotal lid of said casing upwardly and to an open position wherein upon ejection of said cassette from said cassette holder, said locking head of said locking lever contacts the tapered front end of said projection so that the sliding shutter member is shifted to its closed position.

63. The cassette holder as set forth in claim 63, wherein said sliding shutter member is cooperatively associated with a torsion spring for biasing said sliding shutter member in its closed position.

64. The cassette holder set forth in claim 53, wherein said projection means includes a pair of longitudinally aligned projections, one of said longitudinally aligned projections having a tapered front end, while the other longitudinally aligned

* * * * *